US006649064B2

(12) United States Patent
Parekh et al.

(10) Patent No.: US 6,649,064 B2
(45) Date of Patent: Nov. 18, 2003

(54) FILTRATION AND PURIFICATION METHOD FOR AQUEOUS ACIDS

(75) Inventors: Bipin S. Parekh, Chelmsford, MA (US); Anthony J. DiLeo, Westford, MA (US); Edward Deane, Newton Junction, NH (US); Ronald L. Bruening, American Fork, UT (US)

(73) Assignee: Mykrolis Corporation, Billerica, MA (US)

( * ) Notice: Subject to any disclaimer, the term of this patent is extended or adjusted under 35 U.S.C. 154(b) by 0 days.

(21) Appl. No.: 10/058,441

(22) Filed: Jan. 28, 2002

(65) Prior Publication Data

US 2002/0125189 A1 Sep. 12, 2002

Related U.S. Application Data

(63) Continuation of application No. 09/383,055, filed on Aug. 25, 1999, now abandoned.

(51) Int. Cl.[7] .............................................. B01D 61/14
(52) U.S. Cl. ...................... 210/651; 210/638; 210/650
(58) Field of Search ............................. 210/321.6, 490, 210/500.21, 500.36, 502.1, 493.1, 650, 651, 652, 653, 638; 428/422, 480, 475.5, 516, 522, 523, 474.4, 481, 483, 412, 420, 421

(56) References Cited

U.S. PATENT DOCUMENTS

| | | | | |
|---|---|---|---|---|
| 4,618,533 A | | 10/1986 | Steuck | 428/315.7 |
| 4,693,985 A | * | 9/1987 | Degen et al. | 436/531 |
| 4,851,011 A | * | 7/1989 | Lacroix et al. | |
| 4,886,604 A | | 12/1989 | Sleytr et al. | 210/653 |
| 4,943,375 A | | 7/1990 | Bradshaw et al. | 210/674 |
| 4,952,321 A | | 8/1990 | Bradshaw et al. | 210/670 |
| 4,952,386 A | | 8/1990 | Davison et al. | 423/484 |
| 4,959,153 A | | 9/1990 | Bradshaw et al. | 210/670 |
| 4,960,822 A | | 10/1990 | Eichenauer et al. | 525/67 |
| 5,039,419 A | | 8/1991 | Bradshaw et al. | 210/502.1 |
| 5,071,819 A | | 12/1991 | Tarbet et al. | 502/401 |
| 5,078,978 A | | 1/1992 | Tarbet et al. | 423/22 |
| 5,084,430 A | | 1/1992 | Tarbet et al. | 502/401 |
| 5,152,901 A | | 10/1992 | Hodgdon | 210/654 |
| 5,173,470 A | | 12/1992 | Bruening et al. | 502/401 |
| 5,175,110 A | | 12/1992 | Bradshaw et al. | 436/77 |
| 5,179,213 A | | 1/1993 | Bradshaw et al. | 549/3 |
| 5,182,251 A | | 1/1993 | Bruening et al. | 502/401 |
| 5,190,661 A | | 3/1993 | Bruening et al. | 210/670 |
| 5,224,856 A | | 7/1993 | Nakamura | 431/328 |
| 5,244,856 A | | 9/1993 | Bruening et al. | 502/158 |
| 5,266,207 A | | 11/1993 | Boye et al. | 210/653 |
| 5,273,660 A | | 12/1993 | Breuning et al. | 210/670 |
| 5,393,892 A | | 2/1995 | Krakowiak et al. | 549/214 |
| 5,531,899 A | * | 7/1996 | Yen et al. | 210/638 |
| 5,547,760 A | * | 8/1996 | Tarbet et al. | 428/471 |
| 5,618,433 A | | 4/1997 | Tarbet et al. | 210/634 |
| 5,980,759 A | * | 11/1999 | Proulx et al. | 210/767 |
| 5,988,400 A | | 11/1999 | Karachevtcev et al. | 210/493.1 |
| 6,447,684 B2 | | 9/2002 | Parekh et al. | |

FOREIGN PATENT DOCUMENTS

| | | |
|---|---|---|
| WO | WO 95/29008 | 11/1995 |
| WO | WO 99/09091 | 2/1999 |

OTHER PUBLICATIONS

Parekh, B. et al., "Performance of a POU Purifier in Ionic Contamination Removal," *Solid State Technology*, pp. 77–84 (Aug. 1996).

* cited by examiner

*Primary Examiner*—John Kim
(74) *Attorney, Agent, or Firm*—Hamilton, Brook, Smith & Reynolds, P.C.

(57) ABSTRACT

The invention pertains to a method for removing metallic ions and/or particulate material from an aqueous acid solution using particle removing membranes (e.g., ultra high molecular weight polyethylene) having immobilized ligand groups (e.g., macrocycle or other similar chelating ligands) that possess high equilibrium binding constants for ion and particulate removal. The method is particularly useful for simultaneously filtering/purifying aqueous hydrofluoric or hydrochloric acid.

19 Claims, 3 Drawing Sheets

FILTRATION AND PURIFICATION METHOD FOR AQUEOUS ACIDS

RELATED APPLICATION

This application is a continuation of application Ser. No. 09/383,055, filed Aug. 25, 1999, abandoned, the entire teachings of which are incorporated herein by reference.

BACKGROUND OF THE INVENTION

Liquids, such as aqueous liquids, are purified to remove unwanted ions by passing the liquid through a packed column of ion exchange resin beads. In order to improve efficiency of ion removal and rate of processing the liquid, small particle size ion exchange resin beads and high flow rates are desirable. While smaller particle size resin beads improve efficiency in a packed column, they also effect a decrease in the fluid flow rate which, in turn, renders the optimization of the purification process utilizing the beads difficult. A common undesirable phenomenon when using a packed column of beads is the phenomenon of channeling wherein the liquid being purified passes only through a portion of the bed while rendering the remainder of the bed underutilized.

A significant problem associated with incorporating ion exchange resin particles into a polymer matrix is that the resin particles are swellable in aqueous liquids. Thus, when a composite material comprising a polymer binder and the ion exchange resin particles is contacted with water, in the case of a porous membrane composite, the porosity of the composite is significantly reduced thereby significantly reducing the flow rate of the liquid through the porous composite.

Ultrahigh molecular weight polyethylene is a desirable material since it exhibits good chemical resistance to a wide variety of reagents and therefore provides wide flexibility as a material for uses in processes involving contact with these reagents such as in purification processes. Hydrofluoric acid, for example is a reagent commonly employed in the treatment of silicon-based materials such as silicon-wafers used as a base to form integrated circuits. A currently available process for purifying hydrofluoric acid is disclosed for example in U.S. Pat. No. 4,952,386. This process is less desirable since it relies upon the use of columns of ion exchange resin beads.

Accordingly, it would be desirable to provide membranes having ion removal capacity which have high ion capture (efficiency) characteristics, have a high ion removal capacity per unit area and permit maintenance of desirable flow rate per unit area through the membrane when it is wet in aqueous solution. In addition, it would be desirable to provide such membranes which are useful in processing corrosive reagents, including low pH acids such as hydrofluoric acid.

SUMMARY OF THE INVENTION

This invention pertains to a method for removing selected ions (e.g., metallic ions) and particulate material from an aqueous acid solution using particle removing membranes (e.g., ultra high molecular weight polyethylene) having immobilized ligand groups that possess capacity and high equilibrium binding constants for ion removal, even in acid. The method is particularly useful for simultaneously filtering/purifying aqueous acids, such as hydrofluoric or hydrochloric acid.

According to the method of the invention, metallic ions and particulate material are simultaneously removed from an aqueous acid solution by contacting an aqueous acid solution which is contaminated with metallic ions and particulate material with a composition suitable for removing metallic ions and particulate material contained in said solution, then recovering a purified and filtered solution essentially depleted of metallic ions and particulate material. Compositions useful for purifying and filtering comprise an ion-binding ligand bound to a membrane, having an affinity for metallic ions and having an ability to remove particulate material contained in said solution. The membrane ligand combination is represented by the formula:

wherein M is a membrane or composite membrane derivatized to have a hydrophilic surface and containing polar functional groups; L is a ligand (e.g., a macrocycle or other similar chelating ligand) having an affinity for metallic ions and containing a functional group reactive with an activated polar group from the membrane; and B is the covalent linkage formed by the reaction between the activated polar group and the functional group of the ligand. In a preferred embodiment, M is capable of removing particulate material contained in the solution. In another embodiment, the membrane will comprise a plurality of different ligands that are ion specific.

The filtration/purification methods of this invention have several advantages. The fluid to be processed can flow through a membrane structure and react with the ligand that is immobilized on the membrane inner surface with very small mass transfer resistance. This allows the fluid to be processed through membranes at relatively high throughputs with no loss in ligand-ion complexing efficiency. The particle retention properties of membranes have been combined with ligand technology in one system to remove both ions and particles from aqueous acid solutions.

The invention further pertains to filtration/purification devices comprising membranes or composite membranes with immobilized ligand groups. The ligand immobilized membranes have been fabricated into devices that enable high flow rates and low pressure drops. These engineering requirements may not as easily be met with bead technology.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
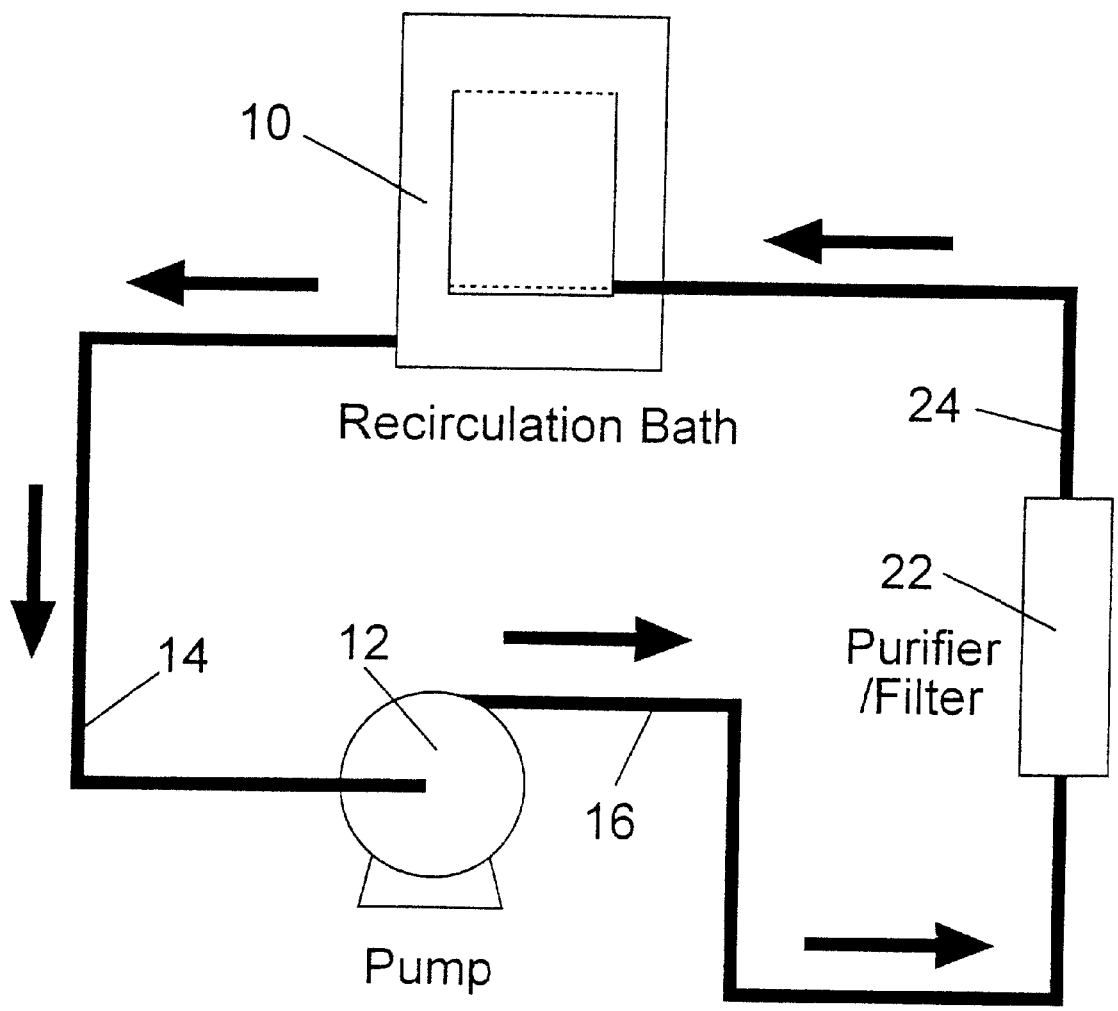
FIG. 1 is a schematic view of a process for filtering/purifying an aqueous acid utilizing a ligand membrane of this invention.

The invention pertains to methods and devices for simultaneously removing metallic ions and particulate material from an aqueous acid solution such as, but not limited to, hydrofluoric acid, hydrochloric acid, carboxylic acid and nitric acid, by using a combination of ligands that have an affinity for metallic ions of interest and membranes that are capable of filtering out particulate material present in the aqueous acid solution. The method uniquely purifies and filters out metallic ions and particulates from an aqueous acid solution. These impurities can be simultaneously removed using membranes or composite (i.e., surface modified) membranes having ion-binding ligands immobilized thereon. The ligands possess ion complexing capacity and high equilibrium binding constants for ion removal.

It should be understood from the discussion herein that the membrane can be used to simultaneously remove metallic ions and particulate material. However, it is not essential that both events occur. For example, a membrane can be chosen such that the pore size is sufficiently large to allow particulates to flow through. Thus, it is contemplated that the ion-binding ligand membrane and devices can be used to remove metallic ions, or remove both metallic ions and particulates.

Metal recovery from aqueous acid waste solutions, e.g., from emulsions on photographic and X-ray films, represent a real need in modern technology. Metal ions and particulate material are typically present at low concentrations in solutions. Hence, there is a real need for a process to efficiently purify and filter aqueous acid solutions for their reuse or disposal. The present invention accomplishes this separation effectively and efficiently by the use of ligands bonded to membranes in accordance with the present invention. It has been found that the membranes of this invention are capable of rapidly and essentially completely removing metals and particulates from aqueous acids to specification levels of about 10 to 50 parts per trillion (ppt).

The methods of this invention can be used in a variety of industrial applications including, but are not limited to, analytical, catalysis, chemical and petrochemical, environmental, food and beverages, metallurgical processes, microelectronics, pharmaceutical/life science, and power generation. Many of these industrial applications contaminate aqueous acid solutions with metallic ions, such as heavy metals, and particulates. In fresh aqueous solutions the sources of particles and ions can come from manufacturing equipment, processes, raw materials and containers. During use the contaminants are added from plumbing and the wafer cleaning operations. The particles are usually submicron colloidal types. Use of the invention can eliminate or reduce environmental considerations associated with disposal of acidic wastes. For example, dilute HF treatment involves precipitation of fluoride as $CaF_2$, followed by neutralization with pH adjustment before discharge. The use of purifiers can increase the bath life and thus reduce the frequency of bath change outs that produce less acid wastes and lower disposal costs.

The general method for removing metallic ions and particulate material from an aqueous acid solution comprises contacting an aqueous acid solution which is contaminated with metallic ions and particulate material with a composition suitable for removing metallic ions and particulate material contained in said solution, then recovering a purified and filtered solution essentially depleted of metallic ions and particulate material. Compositions useful for purifying and filtering comprise an ion-binding ligand membrane, having an affinity for metallic ions and having an ability to remove particulate material contained in said solution. The membrane ligand combination is represented by the formula:

wherein M is a membrane or composite membrane derivatized to have a hydrophilic surface and containing polar functional groups, wherein the membrane is capable of removing/filtering out particulate material, if present, from said solution; L is a ligand having an affinity for metallic ions and containing a functional group reactive with an activated polar group from the membrane; and B is the covalent linkage formed by the reaction between the activated polar group and the functional group of the ligand. Preferably, L is a macrocycle ligand. Representative of B linkages are members selected from the group consisting of amide (NHCO), ester (COO), thioester (COS), carbonyl (CO), ether (O), thioether (S), sulfonate ($SO_3$) and sulfonamide ($SO_2NH$).

In one embodiment, the membrane will comprise a plurality of different ligands that are ion specific. The exact ligands chosen and the ratio of ion specific ligands relative to each other will depend upon the ions to be removed from the aqueous acid solution and the desired lifetime of the filtration/purification system. For instance, the ligand should be highly selective over matrix, such as presence of acid and fluorine ions, and should have a high affinity for ion(s) of interest to allow for efficient binding concentrations of both feed solutions and desired reduced levels. For example, removal of ppb Fe to low ppt Fe in 0.5% HF requires selectivity of Fe over $H^+$ of $\geq 10^7$, and sufficient added affinity to remove at least some of the $F^-$ from the Fe present as $FeF_x^{n-}$. The specific removal of target ions by a ligand is unaffected by other ligands. Ion removal is stoichiometric.

The process of this invention is particularly useful for purifying hydrofluoric acid utilized to dissolve silica compositions such as quartz or glass, as is done in etching silicon wafers. Impure hydrofluoric acid is contacted with the microporous ligand membrane of this invention to effect removal of heavy metal ions (particularly iron and copper ions) and simultaneously remove particulates. The purified hydrofluoric acid is then recovered or recycled for further use. The commonly encountered ion impurities which are removed from hydrofluoric acid in accordance with this invention include iron, copper, nickel, calcium, cobalt, manganese, zinc, chromium, silver and lead. The purified hydrofluoric acid can be monitored, continuously or periodically for the presence of undesired metal ions therein in order to determine whether the membrane of this invention should be replaced with fresh membrane. Referring to FIG. 1, container 10 contains hydrofluoric acid and a material to be contacted with hydrofluoric acid such as silicon wafers. Spent hydrofluoric acid is pumped by means of pump 12 through conduits 14 and 16 into contact with the membrane filter/purifier 22 of this invention which functions to remove ions and particles in the hydrofluoric acid. The purified hydrofluoric acid then is recycled through conduit 24 back to container 10 (e.g., 40 liter size) for reuse.

The filtration/purification process of the invention can be carried out in any manner that provides for bringing the ions and particulate material to be removed from an aqueous acid solution into contact with the ligands affixed to the membrane. The preferred embodiment disclosed herein involves carrying out the process by bringing the aqueous acid solution into contact with a composition of matter of the invention. Contact is preferably made in a contacting device comprising a housing, such as a cartridge, containing the composition of matter of the invention by causing the aqueous acid solution to flow through the housing (e.g., cartridge) and thus come in contact with the composition of the invention. The contacting device can include means for flowing a source solution and a receiving solution past said ligand-membrane composition. Preferably the membrane configuration is a pleated membrane, although other membrane configurations, such as flat sheet, stacked disk or hollow fibers may be used. However, various contact apparatus may be used instead of cartridge. The selected ion or ions complex with the composition and the filtered purified aqueous acid solution can be reused.

The purifier performance is adequate for up to about 5% HF. The ion removal performance decreases with an increase in HF concentration. The HCl performance is adequate for up to about 3 to 4 molar concentration. As above, the ion removal performance efficiency declines at higher HCl concentrations. Thus, as the pH increases to neutrality the purifier and ion removal performance improves. See Example 5.

An advantage of the ligand membrane and cartridges containing the same is that they can be regenerated by removal of bound ions from the ligand. A cleaning method has been developed to remove all contaminants from the device so it would not contribute any significant extractables to the processing fluids. Effective cleaning is a key factor responsible for the superior performance of the ligand/membrane device, especially for applications that require sub-ppb level of cleanliness. This can be accomplished by contacting the membrane with an acid solution (e.g., from about 6M to about 12M acid) under conditions sufficient to remove the ions from the membrane. The ions can be collected and recovered using known techniques. Preferably, the cleaning chemical should be extremely clean (sub-ppb impurity) and should be strong enough to remove all metals bound to the ligand. For example, Megabit grade HCl (from about 6M to about 12M) is preferred (Ashland Chemical Co., Columbus, Ohio).

Compositions useful in the present invention comprise ion-binding ligands that are covalently bonded to a membrane through an amide, ester, thioester, carbonyl or other suitable bond and have been described in detail in U.S. Pat. Nos. 5,547,760, 5,618,433, U.S. Ser. Nos. 08/745,026 and 09/330,543, the entire teachings of which are incorporated herein by reference. Membranes that are inherently hydrophilic, or partially hydrophilic, and contain moieties appropriate for making these bonds are preferred. Such membranes include polyamides, such as nylon, and cellulosic materials, such as cellulose, regenerated cellulose, cellulose acetate, and nitrocellulose. If the membrane used does not contain reactive groups it may be modified or derivatized appropriately. Composite membranes are also useful. A composite membrane comprises a porous polymer membrane substrate and an insoluble, cross-linked coating deposited thereon. Representative suitable polymers forming the membrane substrate include fluorinated polymers including poly (tetrafluoroethylene) ("TEFLON"), polyvinylidene fluoride (PVDF), and the like; polyolefins such as polyethylene, ultra-high molecular weight polyethylene (UPE), polypropylene, polymethylpentene, and the like; polystyrene or substituted polystyrenes; polysulfones such as polysulfone, polyethersulfone, and the like; polyesters including polyethylene terephthalate, polybutylene terephthalate, and the like; polyacrylates and polycarbonates; polyethers such as perfluoroninated polyethers; and vinyl polymers such as polyvinyl chloride and polyacrylonitriles. Copolymers can also be used for forming the polymer membrane substrate, such as copolymers of butadiene and styrene, fluorinated ethylene-propylene copolymer, ethylene-chlorotrifluoroethylene copolymer, and the like. The preferred membrane is hydrophilic ultrahigh molecular weight polyethylene containing carboxylic groups, such as those described in U.S. Pat. Nos. 4,618,533, 5,618,433 and 5,547,760.

With composite membranes, the substrate membrane material is not thought to affect that performance of the derivatized membrane and it is limited in composition only by its ability to be coated, or have deposited on its surface, an insoluble polymer layer that contains the appropriate reactive group. This provides a hydrophilic layer which interacts well with water or other aqueous solutions. The end result is that when the ligand is attached to the surface of either a hydrophilic membrane or a composite membrane having a hydrophilic surface, the basic characteristics of any given ligand molecule are not changed by the process of attaching it to the surface or by the nature of the surface itself.

The coating of composite membranes comprises a polymerized cross-linked monomer such as acrylates, methacrylates, ethacrylates, acrylic acid, acrylamides, methacrylamides, ethacrylamides and mixtures thereof. Representative suitable polymerizable monomers include hydroxyalkyl acrylates or methacrylates including 1-hydroxyprop-2-yl acrylate and 2-hydroxyprop-1-yl acrylate, hydroxypropyl-methacrylate, 2,3-dihydroxypropyl acrylate, hydroxyethylacrylate, hydroxyethyl methacrylate, and the like, and mixtures thereof. Other polymerizable monomers that can be utilized include acrylic acid, 2-N,N-dimethylaminoethyl methacrylate, sulfoethylmethacrylate and the like, acrylamides, methacrylamides, ethacrylamides, and the like. Other types of hydrophilic coatings that can be used within the scope of the invention include epoxy functional groups such as glycidyl acrylate and methacrylate, primary amines such as aminoethyl methacrylates, and benzyl derivatives such as vinyl benzyl chloride, vinyl benzyl amine, and p-hydroxyvinyl benzene.

The basic consideration in selecting a composite membrane is that the coating placed on the membrane substrate is the determining factor in defining the chemistry used to covalently attach the ligand. For example, a composite membrane displaying a carboxylic acid functional group can form an amide bond with a pendant amine group from the ligand, one of the most stable methods of ligand immobilization. The composite polymers referenced above can be prepared with carboxylic acid active groups that can be readily converted to amides upon reaction with an amine group on a ligand. However, any of the other organic species which are reactive toward an acid chloride could be used to attach an organic ligand to the surface. Additional examples of such groups would be esters, thioesters, Grignard reagents, and the like. If the reactive group on the surface is a sulfonic acid, then an analogous procedure using a sulfonyl chloride would yield results similar to those obtained with carboxylic acid functionalities. One such polymer containing sulfonic acid reactive groups is available under the trade name NAFION® from DuPont as described above. Preferably, suitable ligands contain an ester or carboxyl group and an amine to form an amide linkage.

The composite membrane comprises a membrane substrate formed of a first polymer and having coated thereon a second polymer having a hydrophilic surface. The second polymer can be coated onto the first polymer by a precipitated crystal technique. Alternatively, the surface of the first polymer is coated with a cross-linked second polymer formed from a monomer polymerized in situ and cross-linked in situ on the substrate. In one embodiment, the coating of composite membranes also comprises a precipitated crystal system, such as that involving the material known under the trademark NAFION®. NAFION® is a sulfonic acid or sodium sulfonate of a perfluorinated polyether. In another embodiment, the preferred coating is commercially available as ETCHGUARD® (Millipore Corporation); U.S. Pat. No. 4,618,533.

Ligands which may be adapted to contain —NH$_2$, —OH, —SH, —MgX moieties that are reactive so as to form a covalent bond with membrane attached functionalities are described in U.S. Pat. Nos. 5,618,433, 5,547,760 and 5,078,978. The ligand can be selected from the group consisting of amine-containing hydrocarbons (e.g., U.S. Pat. No. 4,952,321), sulfur and nitrogen-containing hydrocarbons (e.g., U.S. Pat. Nos. 5,071,819 and 5,084,430), sulfur-containing hydrocarbons (e.g., U.S. Pat. Nos. 4,959,153 and 5,039,419), crowns and cryptands (e.g., U.S. Pat. Nos. 4,943,375 and 5,179,213), aminoalkylphosphoric acid-containing hydrocarbons (e.g., U.S. Pat. No. 5,182,251), polyalkylene-polyamine-polycarboxylic acid-containing hydrocarbons, proton-ionizable macrocycles (e.g., U.S. Pat. No. 4,960,882), pyridine-containing hydrocarbons (e.g., U.S. Pat. No. 5,078,978), polyetraalkylammonium and polytrialkylamine-containing hydrocarbons (e.g., U.S. Pat. No. 5,244,856), thiol and/or thioetheraralkyl nitrogen-containing hydrocarbons (e.g., U.S. Pat. No. 5,173,470), sulfur and electron withdrawing groups containing hydrocarbons (e.g., U.S. Pat. No. 5,190,661), hydroxypyridinone, hydroxypyridinone on a polyamine or other carrier (e.g., U.S. Ser. No. 09/330,543), and macrocyclic polyether cryptands. The ligands are capable of selectively complexing ions such as either certain alkali, alkaline earth, noble metal, other transition metal, and post transition metal ions when contacted with solutions thereof when admixed with other ions. Particularly preferred ligands used for the above-identified application have been previously described in U.S. Pat. No. 5,618,433 and in U.S. application Ser. Nos. 09/330,543 and 09/330,477, entitled "Polymeric Membranes Functionalized with Polyhydroxypyridinone Ligands" and "Particulate Solid Supports Functionalized with Polyhydroxypyridinone Ligands", both filed on Jun. 11, 1999, e.g., for removal of iron (SuperLig 435®; IBC Corp.); and U.S. application Ser. No. 09/202,731, e.g., for removal of copper (SuperLig 420®; IBC Corp.).

The compositions of the present invention may be prepared by any suitable method wherein the ligands can be covalently bonded to a membrane containing reactive functional groups. See U.S. Pat. No. 5,618,433, issued Apr. 8, 1997, the entire teachings of which are incorporated herein by reference. For example, immobilization of the ligand onto the membrane is carried out in a two step procedure: [1] activation and [2] coupling. The activation procedure involves reaction of carboxylic acid groups on membranes with 1-Ethyl-3-(3-Dimethylaminopropyl) carbodiimide Hydrochloride (EDAC) in either water or IPA/water medium to produce a reactive intermediate compound. In the coupling step this reactive intermediate compound reacts with the amine group on the linker arm attached to the ligand, producing the ligand immobilized membrane surface. The immobilization procedure can be carried out for multiple ligands that are immobilized one at a time (in series), or for multiple ligands co-immobilized simultaneously. In a preferred embodiment, the membrane is an ultrahigh molecular weight polyethylene having a hydrophilic coating, the ligand is covalently attached thereto via amide bonds. The hydrophilic coating is available under the trademark, ETCHGUARD® (Millipore Corp., U.S. Pat. No. 4,618,533).

The membrane/ligand compositions that are useful for carrying out the present invention will be apparent to those skilled in the art by the following examples each of which utilizes a composite membrane prepared according to U.S. Pat. No. 4,618,533 and containing carboxylic acid groups or sulfonic acid groups. One objective of the membrane or composite membrane itself is to filter out particulate material, if present, in the aqueous acid solution. For this purpose, the membranes should have a microporous or ultraporous structure. Microporous pore sizes typically range from about 0.005 to about 10 microns. Ultraporous pore sizes are smaller than microporous pore sizes, typically ranging from about 0.0001 to about 0.005 microns. The ligands may be attached to the upstream outer surface of the membrane, the downstream outer surface of the membrane, the inner porous surface of the membrane or any combination of these surfaces. Preferably, the entire surface of the membrane, including the pores, contain ligands.

The following examples illustrate the present invention and are not intended to be limiting in any way. All references cited herein are incorporated by reference in their entirety.

EXAMPLES

Example 1

Multiple Ligand Immobilization in Series

This example illustrates immobilizing two ligands (SL 435 (Fe—HF ligand) and SL 420; IBC Advanced Technologies, Inc., American Fork, Utah; described in U.S. application Ser. No. 09/202,731) on one cartridge containing a pleated membrane of hydrophilic polyethylene (ETCHGUARD®, Millipore Corp.) (10,000 cm$^2$ surface area). An Fe—HF ligand was first immobilized to the membrane. A cartridge was activated using 15 gms of EDAC dissolved in 1.2 liters of DI water for 15 minutes, followed by additional 15 gms of EDAC in the same solution for 10 more minutes. In the coupling step, the activated cartridge was then contacted with 500 ml of 0.1M Fe—HF macrocycle ligand solution and 1.2 liter DI water. The coupling was effective with or without decanting the activation solution. The coupling reaction contact time can be several hours or up to an overnight duration. The cartridge was washed with DI water to prepare for the second ligand attachment. Two membrane coupons were processed with the cartridge to determine the macrocycle ligand capacity. The Fe capacity measured was 0.108 and 0.0915 $\mu$mole/cm2. The macrocycle ligand concentration can be varied to alter the membrane capacity.

In the second step, ligand SL 420 (e.g., capable of removing nickel, cobalt, zinc and copper) was immobilized following the same procedures described above for activation and coupling. The activation medium was 1.2 liters of 75% IPA (760 g) and 25% DI water (250 g). The SL 420 solution was prepared by dissolving 30 gms of the ligand in one liter of a mixture of 75% IPA (790 ml) and 25% DI water (210 ml). After the coupling reaction, the cartridge was washed with a mixture of 75% IPA (790 ml IPA) and 25% DI water (210 ml). Two membrane coupons were processed with the cartridge to determine the macrocycle ligand capacity. The Cu capacity measured was 0.12 and 0.13 $\mu$mole/cm2. The macrocycle ligand concentration can be varied to alter the membrane ligand capacity.

Example 2

Multiple Ligands Co-immobilized Simultaneously

This example illustrates a single step immobilization of two ligands (SL 435 (Fe—HF ligand) and SL 420) on one cartridge containing a pleated membrane of hydrophilic polyethylene (ETCHGUARD®, Millipore Corp.) (10,000 cm$^2$ surface area). A cartridge was activated using 15 gms of EDAC dissolved in 1.2 liters of DI water for 15 minutes, followed by additional 15 gms of EDAC in the same solution for 10 more minutes (the activation solution). In the coupling step, the activated cartridge was then contacted with a solution containing a mixture 9 gms of SL 420 macrocycle ligand solution, 300 ml of 0.3M Fe—HF ligand solution, 341 g IPA and 150 ml DI water. The coupling was effective with or without decanting the activation solution, the coupling reaction contact time can be several hours or up to an overnight duration. A membrane coupon was processed with the cartridge to determine the macrocycle ligand capacity. The Fe capacity measured was 0.058 and Cu capacity was 0.083 $\mu$mole/cm$^2$. The ligand concentration can be varied to alter the membrane capacity.

Performance Model $$C_{cu} = \frac{VC_0(H^+)^2/A}{V(H^+)^2/A + Kq_0 - KVC_0/A}$$

Where:
$C_{cu}$=equilibrium copper concentration (mol/l)
V=volume (liters)
$C_0$=initial Cu concentration (mol/liter)
H+=hydrogen ion concentration (mol/l)
K=equilibrium binding constant (mol/l)
$q_o$=membrane capacity (mole/cm$^2$)
A=cartridge area (Cm$^2$)

Example 3
Purification of HF

Figure 2:
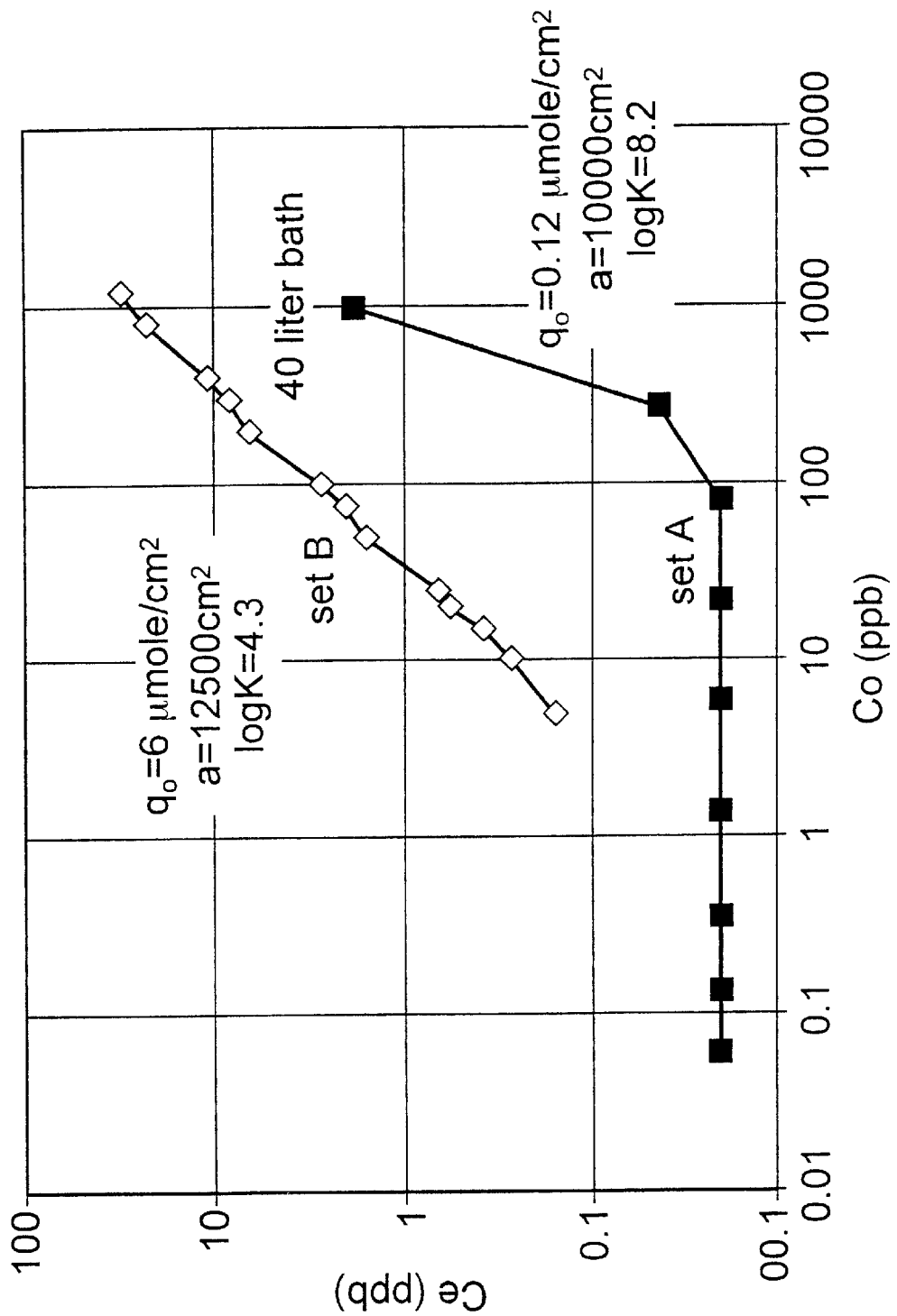
FIG. 2 is a graphic illustration of the effectiveness of a ligand membrane (shaded boxes) having a ligand specific for copper removal from aqueous acids, compared to an ion exchange membrane (open diamonds).
Figure 3:
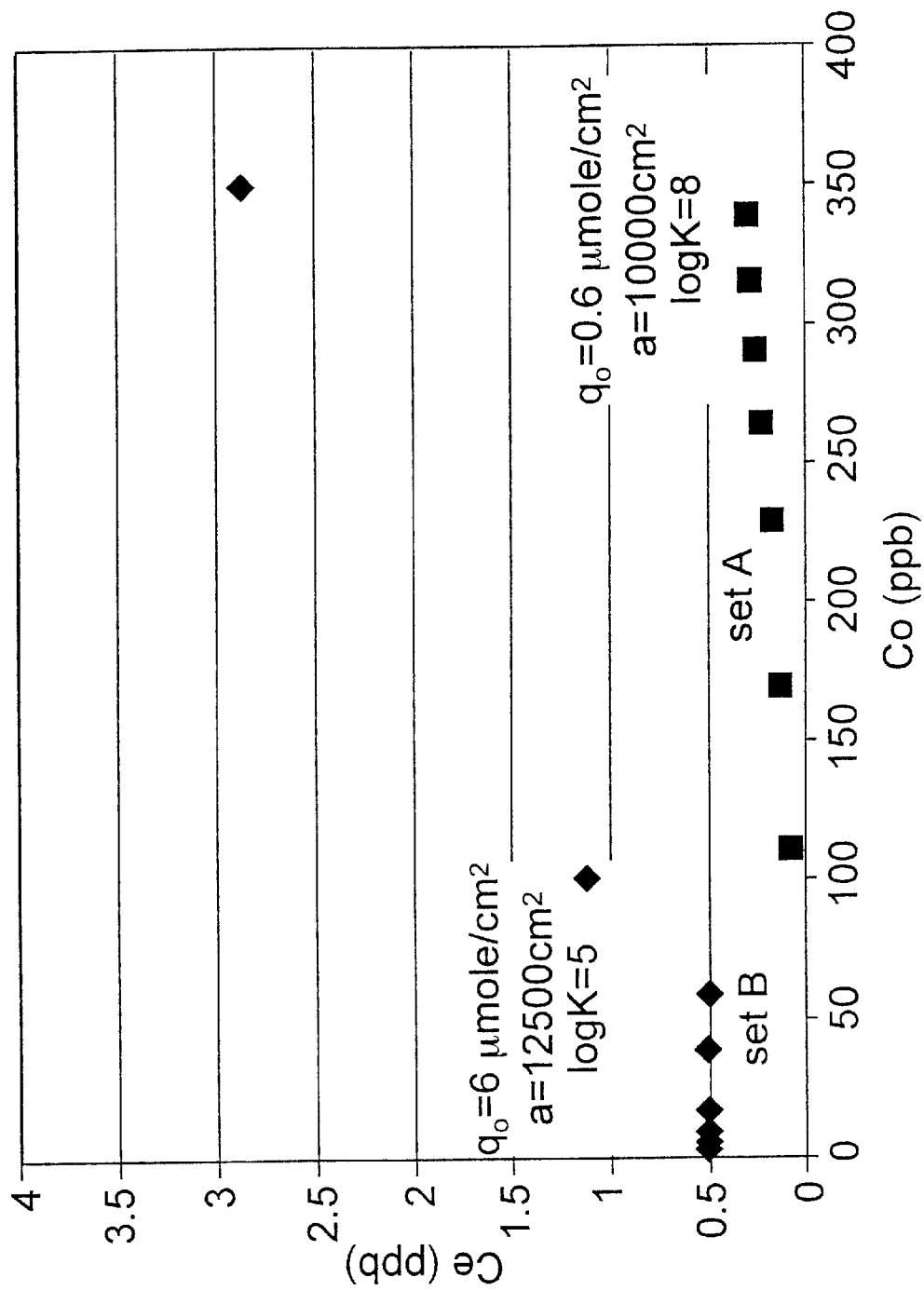
FIG. 3 is a graphic illustration of the effectiveness of a membrane having a ligand specific for iron removal from aqueous acids. Ion exchange cartridge data are represented by shaded diamonds; ligand membrane coupon data are represented by shaded boxes.

This example illustrates the use of a ligand membrane of this invention to purify aqueous hydrofluoric acid solution containing metal ions. A hydrofluoric acid solution having pH of ~1.9 and containing metal ions was passed through a device made with a pleated configuration of a macrocycle ligand immobilized membrane. The membrane area was about 10,000 cm$^2$ (hydrophilic polyethylene) and had a capacity of 0.12 $\mu$mol/cm$^2$ macrocycle ligand (SL 420). The solution was circulated through the purifier/filter until the metal ions were removed to the low equilibrium (sub-ppb) levels. After the system achieved the low equilibrium metal ion concentration [$C_e$(ppb)], additional metal ions were added [$C_0$(ppb)] to the hydrofluoric acid and the process repeated until a new equilibrium concentration was achieved. The procedure was repeated with many additional metal spikes to the hydrofluoric acid solution. As shown by the data points "set A" in FIG. 2, the purifier removed the metal ions added to the bath to very low levels (<20 ppt). The equilibrium reduction performance of the ligand immobilized membrane device, "set A", is superior to that of the ion exchange resin membrane based device "set B". The higher equilibrium binding constant of the macrocycle ligand device (logK=8.2) than the ion exchange chelator membrane (logK=4.3) yields better performance even though the capacity of the ion exchange membrane is five times that of the macrocycle ligand device. FIG. 2 illustrates the effectiveness of a macrocycle ligand (SL 420) specific to copper removal from aqueous acids. FIG. 3 illustrates similar performance for an iron macrocycle (Fe—HF ligand) in dilute hydrofluoric acid. In FIG. 3, "set B", shows data for ion exchange chelator resin membrane and "set A" shows the performance expected from a macrocycle ligand membrane device (scaled up from the membrane coupon data).

Example 4
Device Cleaning

The membrane device was cleaned using 2–4 liters of 100% isopropyl alcohol (IPA) to remove organics, followed by a deionized (DI) water flush to remove IPA. The device was then cleaned with concentrated hydrochloric acid, HCl, 6 molar (e.g., for copper ligand) to 12 molar (e.g., for iron ligand) concentration. The device was static soaked in 1.2 liters of acid for 1–2 hours, followed by an additional 8 liters of acid flowed through the device at 30–50 ml/min flow rate. The device was drained to remove all acids. The device was then flushed with the ultrahigh purity deionized water to remove all traces of residual acid. This cleaning procedure was very effective in producing clean devices of extremely low extractables.

Example 5
Ion Removal Efficiency

TABLE

| 0.5% HF pH = 2.20 | | 5% HF pH = 1.527 | |
|---|---|---|---|
| Co(ppb) | Ce(ppb) | Co(ppb) | Ce(ppb) |
| 199.4 | 3.3 | 85.8 | 4.72 |
| 502.5 | 7.6 | 226 | 14.6 |
| 862 | 29.1 | 505 | 97.2 |
| 1572 | 752 | 749.5 | 178 |
| 2014 | 952 | 1658 | 1088 |
| 2840 | 2038 | 2390 | 1528 |

Fe-HF ligand
Area = 17.3 cm$^2$
Vol. = 50 ml
qo = 0.035 $\mu$mole/cm$^2$
Trivalent Fe$^{+3}$
Static soak equilibrium experiments
$C_0$ = starting concentration
$C_e$ = exit of treated concentration
Results show less Fe removal in 5% HF solution (i.e., Ce(ppb) values are higher for 5% HF).

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for simultaneously removing metallic ions and particulate material from an aqueous acid solution, comprising contacting said solution with a composition suitable for simultaneously removing metallic ions and particulate material contained in said solution and recovering a purified and filtered solution essentially depleted of metallic ions and particulate material to sub-parts-per-billion; wherein the composition comprises a membrane ligand combination represented by the formula:

M—B—L wherein M is a membrane or composite membrane having a hydrophilic or partially hydrophilic surface and containing polar functional groups and having a pore size sufficient to filter particulate material contained in said solution;

L is a ligand having an affinity for metallic ions and containing a functional group reactive with an activated polar group from the membrane; and B is a covalent linkage formed by the reaction between the activated polar group and the functional group of the ligand.

2. The method according to claim 1 wherein L is a ligand selected from the group consisting of amine-containing hydrocarbons; sulfur and nitrogen-containing hydrocarbons; sulfur-containing hydrocarbons; crowns and cryptands; aminoalkylphosphoric acid-containing hydrocarbons; proton-ionizable macrocycles; pyridine-containing hydrocarbons; polytetraalkylammonium and polytrialkylamine-containing hydrocarbons; thiol and/or thioetheraralkyl nitrogen-containing hydrocarbons; sulfur and electron withdrawing group-containing hydrocarbons; hydroxypyridinone; and oxygen donor macrocycles.

3. The method according to claim 2 wherein B is a covalent linkage selected from the group consisting of amide (NHCO), ester (COO), thioester (COS), carbonyl (CO), ether (O), thioether (S), sulfonate ($SO_3$), and sulfonamide ($SO_2NH$) linkages.

4. The method according to claim 3 wherein M is a membrane selected from the group consisting of polyamides and cellulosics.

5. The method according to claim 4 wherein said membrane is a polyamide comprising nylon.

6. The method according to claim 4 wherein said membrane is a cellulosic selected from the group consisting of cellulose, regenerated cellulose, cellulose acetate and nitrocellulose.

7. The method according to claim 3 wherein M is a composite membrane comprising a membrane substrate formed of a first polymer, said substrate being directly coated on its entire surface with a second polymer by a precipitated crystal technique and having a hydrophilic surface.

8. The method according to claim 7 wherein said first polymer is a polymer or copolymer of a member selected from the group consisting of fluorinated polymers, polyolefins, polystyrenes, polysulfones, polyesters, polyacrylates, polycarbonates, vinyl polymers and polyacrylonitriles.

9. The method according to claim 8 wherein said second polymer is a perfluorinated polyether.

10. The method according to claim 3 wherein M is a composite membrane comprising a membrane substrate formed of a first polymer, said substrate being directly coated on its entire surface with a cross-linked second polymer formed from a monomer polymerized in situ and cross-linked in situ on said substrate and having a hydrophilic surface.

11. The method according to claim 10 wherein said first polymer is a polymer or copolymer of a member selected from the group consisting of fluorinated polymers, polyolefins, polystyrenes, polysulfones, polyesters, polyacrylates, polycarbonates, vinyl polymers and polyacrylonitriles.

12. The method according to claim 11 wherein said second polymer is formed from a polymerizable monomer selected from the group consisting of acrylates, methacrylates, ethacrylates, acrylic acid, acrylamides, methacrylamides, ethacrylamides and mixtures thereof.

13. The method according to claim 12 wherein B is an amide linkage.

14. The method according to claim 3 wherein B is a sulfonamide linkage.

15. The method according to claim 1 wherein said composition is contained in a contacting device for holding said composition, wherein said contacting device includes means for flowing a source solution and a receiving solution past said composition.

16. The method according to claim 15 wherein said contacting device comprises cartridge means.

17. A method for simultaneously removing metallic ions and particulate material from an aqueous hydrofluoric acid solution, comprising contacting said solution with a composition suitable for simultaneously removing metallic ions and particulate material contained in said solution and recovering a purified and filtered solution essentially depleted of metallic ions and particulate material to sub-parts-per-billion; wherein the composition comprises a membrane ligand combination represented by the formula:

M—B—L wherein M is a membrane or composite membrane having a hydrophilic or partially hydrophilic surface and containing polar functional groups and having a pore size sufficient to filter particulate material contained in said solution;

L is a ligand having an affinity for metallic ions and containing a functional group reactive with an activated polar group from the membrane; and B is a covalent linkage formed by the reaction between the activated polar group and the functional group of the ligand.

18. A method for simultaneously removing metallic ions and particulate material from an aqueous hydrochloric acid solution, comprising contacting said solution with a composition suitable for simultaneously removing metallic ions and particulate material contained in said solution and recovering a purified and filtered solution essentially depleted of metallic ions and particulate material to sub-parts-per-billion; wherein the composition comprises a membrane ligand combination represented by the formula:

M—B—L wherein M is a membrane or composite membrane having a hydrophilic or partially hydrophilic surface and containing polar functional groups and having a pore size sufficient to filter particulate material contained in said solution;

L is a ligand having an affinity for metallic ions and containing a functional group reactive with an activated polar group from the membrane; and B is a covalent linkage formed by the reaction between the activated polar group and the functional group of the ligand.

19. The method of claim 1 wherein the aqueous acid solution is selected from the group consisting of hydrofluoric acid, hydrochloric acid, carboxylic acid and nitric acid.

* * * * *